United States Patent [19]

Elder

[11] Patent Number: 5,398,984
[45] Date of Patent: Mar. 21, 1995

[54] GARMENT HANGER DEVICE

[76] Inventor: Todd E. Elder, 221 Henderson Blvd., Kilgore, Tex. 75662

[21] Appl. No.: 20,707

[22] Filed: Feb. 22, 1993

[51] Int. Cl.⁶ .......................... A47G 25/06; B65G 7/12
[52] U.S. Cl. ................................ 294/142; 294/137; 294/167
[58] Field of Search ........................ 294/137, 141–143, 294/153, 158, 159, 167, 169; 70/456 R–459; 211/13, 106, 113, 115, 116, 118, 119, 119.12, 123, 124; 223/85, 88, DIG. 4; 224/42.45 A, 42.46 A, 197, 217, 251, 313; 248/339, 340

[56] References Cited

U.S. PATENT DOCUMENTS

| | | | |
|---|---|---|---|
| 587,634 | 8/1897 | Archbold | 294/137 |
| 2,782,974 | 2/1957 | Borgfeldt | 294/159 |
| 2,873,898 | 2/1959 | Englund | 223/88 |
| 3,162,473 | 12/1964 | George | 294/142 |
| 3,313,460 | 4/1967 | Hooker | 294/159 |
| 3,860,154 | 1/1975 | Atkins | 223/88 |
| 3,963,154 | 6/1976 | Schwartz et al. | 223/88 X |
| 4,466,652 | 8/1984 | Townsend | 294/142 |
| 5,074,445 | 12/1991 | Chen | 223/88 X |

*Primary Examiner*—Johnny D. Cherry
*Attorney, Agent, or Firm*—Vickers, Daniels & Young

[57] ABSTRACT

A garment hanger device which conveniently supports a plurality of clothes hangers in an automobile is disclosed. The garment hanger has a frame member which the clothes hangers are directly hung upon and a support member which attaches to the automotive cloth hooks. The frame member and support member are connected together by a non-rigid coupling mechanism which allows the frame member to move relative to the support member.

21 Claims, 3 Drawing Sheets

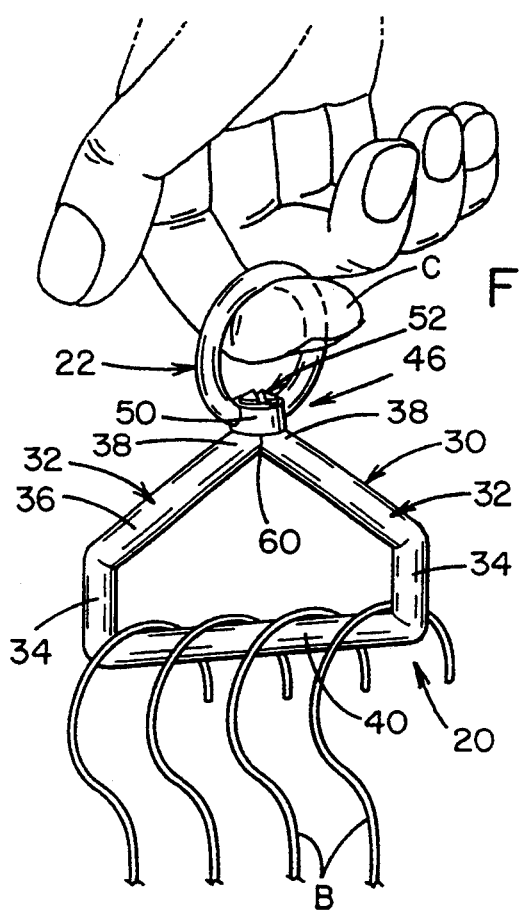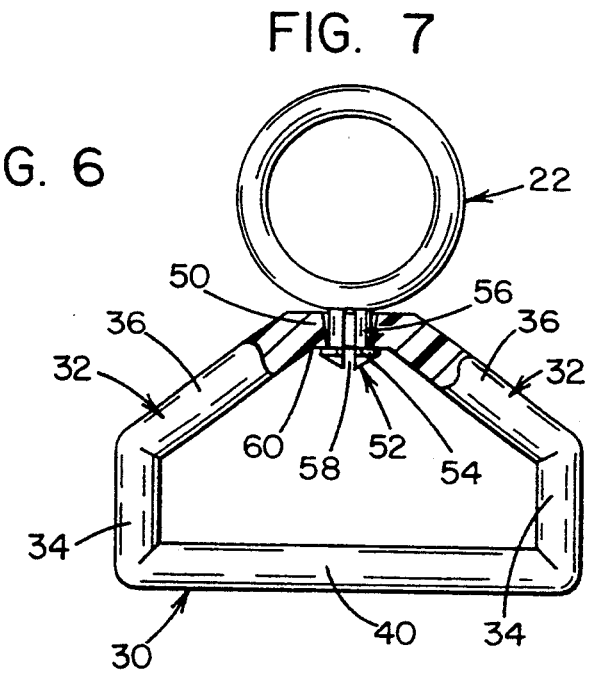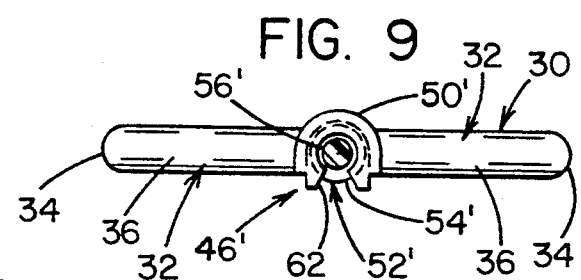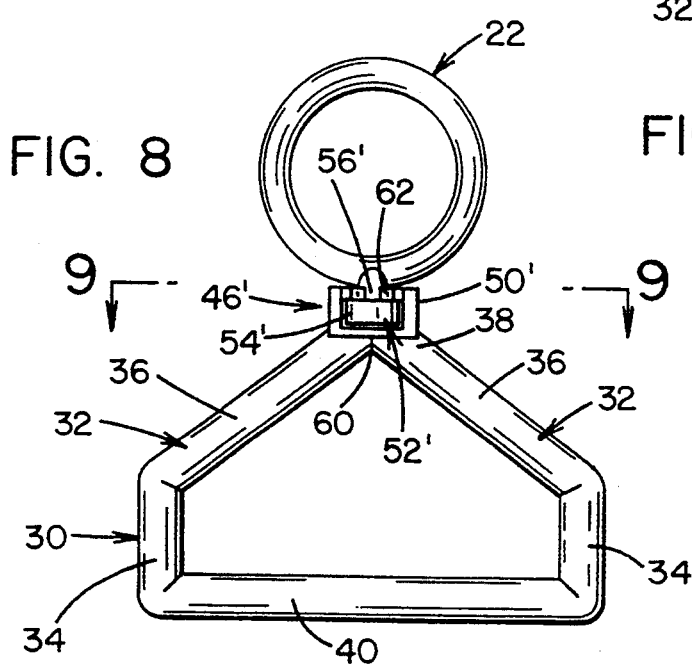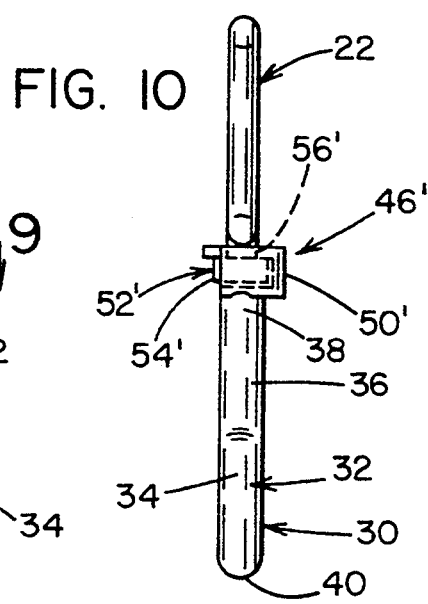

GARMENT HANGER DEVICE

This invention relates to the art of supporting clothing on cloth hangers and more particularly to a support device for supporting a plurality of cloth hangers in an automobile.

BACKGROUND OF THE INVENTION

The present invention is particularly applicable to supporting a plurality of coat hangers for garments in an automobile without impairing the driver's view in the rear window and will be discussed with particular reference thereto; however, the invention has broader applications and may be used to support a plurality of coat hangers for garments in a variety of different types of applications. It is well known that garments may be hung in an automobile by positioning a hang bar or cord between the two garment hooks typically located near the roof of the back seat of the car. Once the hang bar has been positioned in the car, the garments are hung along the bar. As more and more garments are hung on the hang bar, the driver's clear view through the rear view window is impaired. The movement of the garments on the hang bar or cord also can be distracting to the driver. The impaired view from the hanging garments can result in accidents from cars which the driver could not see approaching. The impaired view may also prevent the driver from seeing an emergency vehicle attempting to pass the driver. A sudden stop by the driver may result in clothing being flung into the front seat which could distract the driver and result in an accident. Finally, the use of a hang bar or cord prevents passengers from being able to use the backseat since the cord or bar may also cause injury to backseat passengers' heads due to a sudden start or stop of the vehicle. The persons not wanting to purchase or use a hang bar or cord connected between the two sides of a vehicle presently have few, if any, options to hang a plurality of garments. The garment hooks on the car are only designed to hold only few garments, normally two or three per hook. As a result, a person having several garments will either have to lay some of the garments on the seat resulting in wrinkled garments or use a hang bar or cord.

THE INVENTION

The present invention contemplates a new and improved device for hanging a plurality of garments in an automobile, thus increasing the utility of the garment hooks in the automobile which overcomes all the above referred to problems and others, therefore allowing a person to hang several garments in an automobile without impairing the vision of the driver through the rear view window.

In accordance with the principal feature of the present invention, there is provided a garment hanger device for supporting at least one garment hanger. The garment hanger device includes a frame member which has at least one bar structure and at least two leg structures. At each end of the two ends of the bar structure is attached at least one leg structure. The material which forms the leg structures and the bar structure is not limited. The material used can be metals, wood, fabrics, glass and/or plastics. Generally, the leg structure and bar structure are made of the same material. Typically, both the leg structure and bar structure are made of a plastic material, because of the relative inexpensive cost of the material and the ease at which it can be formed. When a plastic material is used, the bar structure and leg structure can be formed by extrusion, mold or stamp process. Normally, the structures are simultaneously formed in a mold. The cross-sectional shape of the bar structure and leg structure is not limited to any one shape. Generally, the cross-sectional shapes of the structures are uniform throughout the length of the respective structure. A circular cross-sectional shape is the typical shape for both the leg structure and the bar structure. The diameter of a circular cross-sectional shape generally ranges between ⅛ inch to ½ inch. The material of the bar structure and the leg structure and the cross-sectional shape of each structure should be such that the frame member can support at least a load of 100 pounds. The length of each leg structure of the frame member can be the same or different length. Normally, the lengths of the leg structure are the same and typically range between one inch to six inches. The length of the bar structure typically ranges between one inch to ten inches. The length of the hang bar structure is generally limited to less than six inches to prevent the frame member from excessively tilting when a few garment hangers are placed on the hang bar structure. The garment hangers will generally move along the length of the hang bar structure when a vehicle is moving. When the garment hangers move to one end of the hang bar structure, the weight of the garment hangers will cause the frame member to tilt. Excessive tilting of the frame member may result in the garment hanging device to disengaging from the automotive hooks. By limiting the length of the hang bar structure, the tilt caused by the movement of the garment hangers is limited so that the garment hanging device does not disengage from the automotive hooks. A support member is also provided to support the frame member on the automobile garment hook. The support member is typically connected to the frame member in a non-rigid manner so as to allow the frame member to move with respect to the support member. The garment hangers are normally hung on the bar structure of the frame member.

In accordance with another feature of the present invention, the leg structures are attached to the ends of the bar structure and form an angle between the leg structure and bar structure which is less than 180°. The angle which is formed between each leg structure and each bar structure is generally between 60° and 120° and typically about 90°. An angle which is less than 60° may cause increased difficulty in removing and inserting the garment hanger on the bar structure adjacent to the leg structure. Angles which are greater than 120° allow the garment hanger to move off the bar structure and onto the leg structure which may result in the garment hanger disengaging from the garment hanger device.

In accordance with another feature of the present invention, the leg structures have two tips whereby one tip is generally attached at or near the end of the bar structure. The leg structure may be connected to the bar structure at any location along the leg structure, but is typically attached at the tip of the leg structure. The connection between the leg structure can be formed in any fashion such as glued, tacked, screwed, etc. Generally, the leg structure and bar structure are molded together to form a strong and uniform connection.

In accordance with yet another feature of the present invention, the tip of the leg structure not connected to the bar structure converges onto an apex point. The tips of the leg structures typically are connected together at the apex point. However, the tips can approach the apex point but never reach the apex point or the tips can extend through and beyond the apex point. Any angle can be formed between any two leg structures that are connected at the apex point; however, the angle is typically not greater than 180°. When the tips of the leg structures are joined at the apex point, the manner of joining the tips can be any type which produces a strong connection such as glue, tacks, screws, ties, etc. Typically, the tips are molded together to form a strong connection between the leg structures.

In accordance with another feature of the present invention, each leg structure on the frame member has at least two leg portions. The leg portions on the leg structure are connected together in such a manner so as to form some type of angular relationship between the two leg portions. The number of leg portions on a leg structure is not limited. A large number of leg portions will form a leg structure with a smooth curved surface such as a semi-circular shape. Generally, the leg structure has less than five leg portions and typically only two leg portions. Each leg portion can be of any length. When two leg portions are formed on the leg structure, each leg portion typically has a different length. The leg portion attached to the bar structure is typically the shortest of the two leg portions. Normally, the leg portion which is attached to the bar structure is attached perpendicular to the bar structure and typically has a length of less than 2 inches. A leg structure having two leg portions has an angle between the two leg portions which is less than 180° and typically not less than 90°. The leg portions can be attached together in any fashion such as gluing, tacking, screwing, tying, welding, soldering, etc. Generally, the leg portions are made of plastic and are formed in a mold. A frame member having one straight bar structure and two leg structures, each having two leg portions, will typically form a frame member having the shape similar to a house.

In accordance with another feature of the present invention, the hang bar structure has at least two bar portions. The number of bar portions on the hang bar structure is not limited. A large number of bar portions will form a hang bar structure with curved surfaces which may be semicircular in shape. Generally, less than five bar portions are formed onto a hang bar structure. Each bar portion can have the same or variable lengths. The bar portions can be attached in a variety of ways. Typically, the bar portions are made of plastic and are formed in a mold.

In accordance with still yet another feature of the present invention, the hang bar structure has at least one groove structure. The groove structures are typically small notches formed on the hang bar structure. The groove structure prevents a garment hanger from easily sliding back and forth along the length of the hang bar structure, especially while a vehicle is in motion. The bar structure typically has a plurality of groove structures evenly spaced apart.

In accordance with still yet another aspect of the present invention, the support member is designed to engage with an automotive hook. Most vehicles have an automotive hook located in the rear of the vehicle and near the ceiling of the vehicle. The automotive hook typically extends less than 1 inch from the side interior of the vehicle. The cross-sectional shape of the automotive hook is typically rectangular and has a width less than 1 inch and a depth of less than ½ inch. The support member on the garment hanging device is designed so that it can be secured to a typical automotive hook; however, the support member can be designed so that it can also engage other shaped and sized automotive hooks. The support member can have a number of shapes. Generally, the support member is circular in shape. A circular shape is typically used since it can be easily inserted about an automotive hook. The circular shape is also convenient for persons holding the garment hanging device by easily placing their finger through the circular support member. A circular support member normally has a diameter which is larger than the width of the automotive hook. The diameter of a circular support member is usually less than 2 inches. The diameter of the circular support member must be large enough to fit about the automotive hook yet not too large such that the support member can easily disengage from the automotive hook while the vehicle is moving. The circular shape of the support member allows the garment hanger device to slightly move about the automotive hook when the vehicle suddenly accelerates or decelerates. A rigid connection between the automotive hook and the garment hanger device would create large forces on the automotive hook during sudden speed changes in the vehicle, especially if there are heavy garments on the garment hanger device. These large forces on the automotive hook can result in the hook shearing from the vehicle. The slight movement of the garment hanger device allowed by a circular support member significantly reduces the forces on the automotive hook during sudden speed changes, thus essentially eliminating the potential problem of the shearing off of the automotive hook. The cross-sectional shape of the support member is not limited to any one shape. Typically, the cross-sectional shape of the support member is circular and has a diameter which is usually less than ¼ inch. The support member can be made of any material which can support at least a one pound load. Generally, the support member is made of a plastic and is typically formed by a mold, stamp or extrusion process.

In accordance with another aspect of the present invention the support member and the frame member of the garment hanging device are connected together by a non-rigid coupling mechanism which allows the frame member to move relative to the support member. The non-rigid connection is desirable so as to allow the frame member to move with respect to the support member to prevent additional stress to the support member and the automotive hook. The stresses on the automotive hook and support member can be caused by the load on the garment hanger device and/or from the movement of the vehicle. When garments are hung on the garment device, the garments do not always lay flat against the vehicle, causing the frame member to slightly move. As more and more garments are placed on the garment hanger device, the more the frame member moves relative to the vehicle. A rigid construction between the frame member and support member will force the support member to twist. However, since the automotive hook prevents the support member from twisting, stress results on the support member and automotive hook. The stress can cause damage to the automotive hook and/or the support member, especially if there is a large load on the frame member due to heavy garments. Stress on the automotive hook and support member can also result from the movement of the vehicle. When the vehicle accelerates, decelerates, turns or travels over rough roads, the garments on the garment hanger device tend to move around causing even greater stresses on the support member and the automotive hook. The non-rigid coupling mechanism significantly reduces much of the stress which is applied to both the automobile hook and the support member. The coupling mechanism allows the frame member to twist relative to the support member, therefore allowing the frame member to freely twist so that the garments naturally hang in the vehicle. The couple mechanism also significantly reduces stress when the garments move around, especially when the vehicle is moving. As the garments slightly move in the vehicle, the freely moving frame member moves with the garments, thus eliminating stresses on the support member which would normally result from a rigid connection between the frame member and the support member. The couple mechanism also helps prevent the support member from disengaging from the automobile hook when the garments move inside the vehicle by preventing the direct translation of rotation motion from the garments to the support member. The couple mechanism typically incorporates a snap lock mechanism between the support member and frame member; however, other connection mechanisms can be used. The snap lock mechanism includes a clip and a lock. The clip can be located either on the support member or the frame member and the respective lock is typically located on the member opposite the clip. The snap lock mechanism of the coupling mechanism forms a connection between the support member and frame member by inserting the clip into the lock. The clip can be inserted into the lock in a variety of ways, but is typically inserted through the center of the lock or into the side of the lock. The clip is typically a rod-like structure protruding out from the frame member or support member. The clip can be located anywhere on the support member or frame member. When the clip is located on the frame member, the clip is connected near or on the apex point where the tips of the leg structures converge. If the clip is located on the apex point, the leg tips typically connect to the clip. The clip can be of any length, but is generally less than 1 inch long. The cross-section shape of the clip is generally circular; however, it may take on a variety of other shapes. The diameter of a circular cross-section of the clip is normally less than ½ inch but can be larger to support heavier loads. The clip may have a head located at the end of the clip. The diameter or cross-sectional area of the head is typically the largest part of the clip. The large cross-section of the head prevents the clip from unintentionally disengaging from the lock. The head may also have an angular portion to facilitate insertion into the lock. The clip may also have a longitudinal void to allow the cross-sectional areas of the clip to temporarily contract during insertion into the lock. The lock is shaped to engage the clip and create a secure and non-rigid connection. The lock generally has a hollow cylindrically shaped interior; however, other shapes can be used. The diameter of a cylinder is generally the same or slightly greater than the diameter of a cylindrically shaped clip. If the clip has a head, the diameter of the head is normally larger than the inner diameter of the lock. The inner diameter of the hollow interior of the lock may vary longitudinally. A tapering diameter design for the lock facilitates the insertion of the clip into the lock. Typically, the larger diameter of the hollow interior is located at the base of the lock where the clip is first inserted. The non-rigid connection is formed between the lock and clip by allowing the clip to rotate within the lock. The clip is secured in the lock by inserting the head of the clip completely through the lock. Since the clip head has a larger diameter than the interior of the lock, the clip head cannot freely pass through the lock, thus forming a secure connection. The clip can also be inserted into the side of the lock. The configuration of the lock is modified for this type of connection. The lock typically has two or more hollow cylindrical portions each having different diameters. The clip head is inserted into one cylindrical portion and the rest of the clip is inserted into the other cylindrical portions. Since the diameters of the cylindrical portions are different, the clip head cannot longitudinally pass through the small cylindrical portion, thus forming a connection between the clip and lock. The lock has a side opening which is generally smaller than the diameter of the clip and/or clip head. When the clip is inserted into the lock, the side opening slightly widens to allow the clip into the lock and then reforms to its original position to secure the clip in the lock. A multitude of other securing mechanism configurations can be employed such that the clip and lock form a secure connection and allow the frame member to rotate with respect to the support member. The clip and lock are generally made of a plastic material, but other materials can be used. A plastic clip and lock may be formed in a mold and can be simultaneously formed with the support member or frame member. The coupling mechanism is designed such that it can support loads of at least one-hundred pounds.

The principal object of the present invention is to provide a garment hanger device for supporting a plurality of garment hangers.

Another object of the present invention is to provide a garment hanger device having a frame member which includes a bar structure for supporting garment hangers and two leg support structures whereby one tip of the leg structure is connected to the bar structure end and the other tip converges onto an apex point, thus forming a generally triangular frame member.

Yet another object of the present invention is to provide a support member which connects the frame member to the automobile hook in a vehicle.

Yet still a further object of the present invention is to provide a mechanism for connecting the support member to the frame member to allow the frame member to move with respect to the support member.

These and other objects and advantages will become apparent from the following description used to illustrate the preferred embodiment of the invention when read in conjunction with the accompanying drawings.

BRIEF DESCRIPTION OF THE DRAWINGS

FIG. 6 illustrates a garment hanger device hanging from the finger of a human finger;

FIG. 7 illustrates a second type of coupling mechanism for connecting the support member to the frame member;

FIG. 8 illustrates yet another alternative configuration for connecting the support member to the frame member;

FIG. 9 is a top view partially in section taken on line 9—9 of FIG. 8 of the garment hanger device as illustrated in FIG. 8; and FIG. 10 illustrates a side elevational view of the garment hanger device of FIG. 8.

PREFERRED EMBODIMENT

Figure 1:
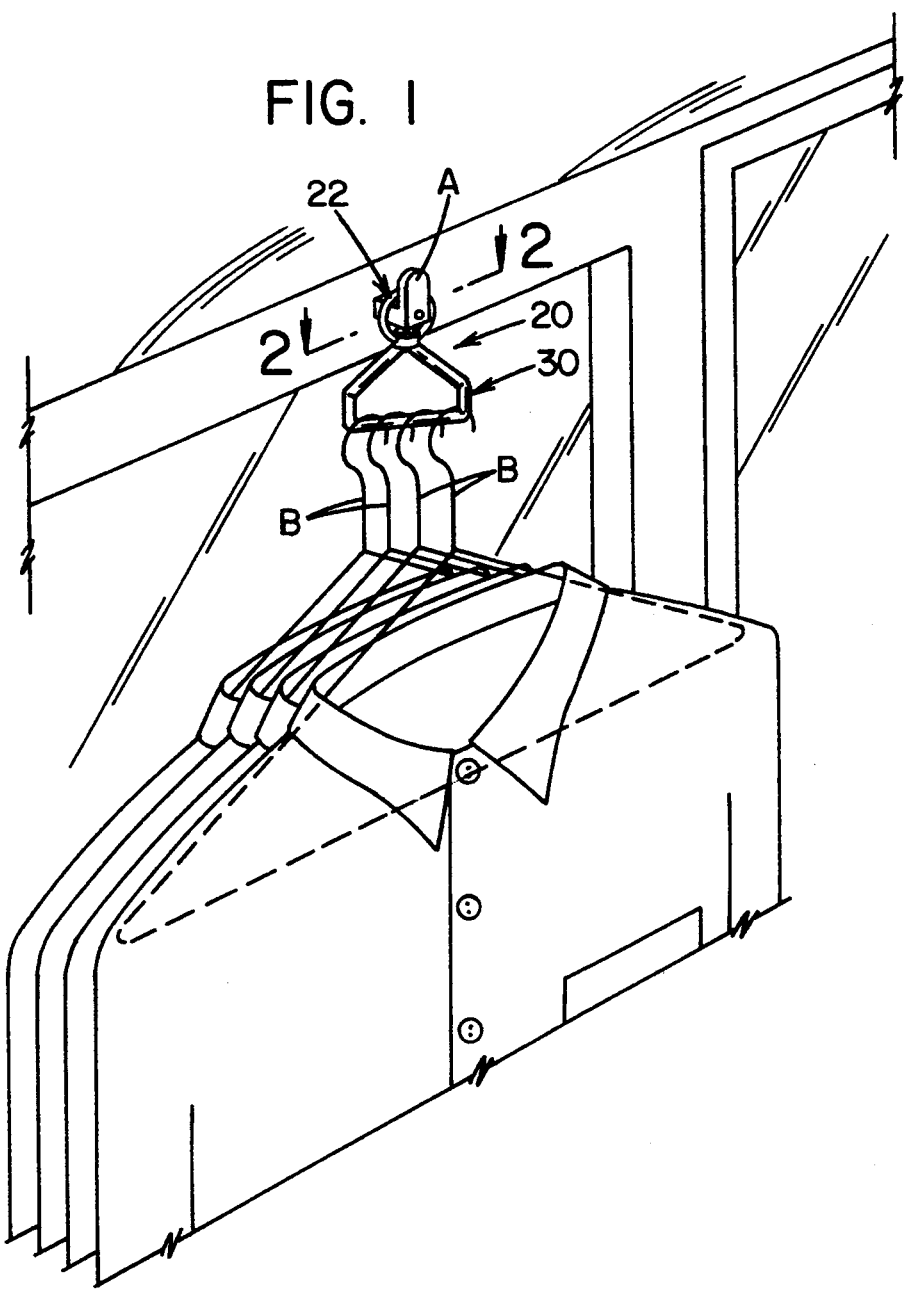
FIG. 1 illustrates a garment hanger device supporting a plurality of hangers and connected to an automobile hook.
Figure 2:
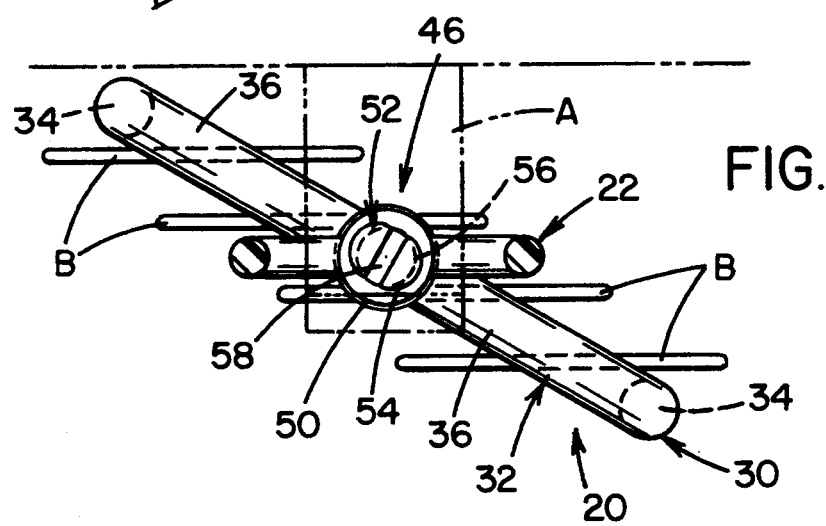
FIG. 2 illustrates an enlarged top view partially in section of the garment hanger device taken on line 2—2 of FIG. 1.

Referring now to the preferred embodiment of the invention only and not for the purposes of limiting same, FIG. 1 illustrates a garment hanger device 20 in accordance with the present invention. Garment hanger device 20 is connected to automobile hanger hook A and is supporting a plurality of garment hangers B. The garment hangers B are located on the generally triangular frame member 30 which is connected to car hook A by circular support member 22. Garment hanger device 20 as illustrated in FIG. 2 shows that frame member 30 can rotate with respect to support member 22 so as to better support a plurality of garment hangers B. Preferably, frame member 30 is connected to support member 22 in such a manner as to allow frame member 30 to freely rotate with respect to support member 22. Support member 22 as illustrated in FIG. 1 is preferably of a circular design and shape and has an interior diameter that is large enough to allow the support member to be inserted onto car hook A. In addition, support member 22 may also be connected to a variety of hooks or may be carried by hand as illustrated in FIG. 6. The inner diameter of the circular support member 22 preferably ranges between ½ inch to 1 ½ inches and typically has a diameter of approximately 1 inch. The inner diameter of 1 inch for the circular support member 22 allows the support member 22 to be inserted onto most types of car hooks and may be conveniently carried by most persons.

Figure 3:
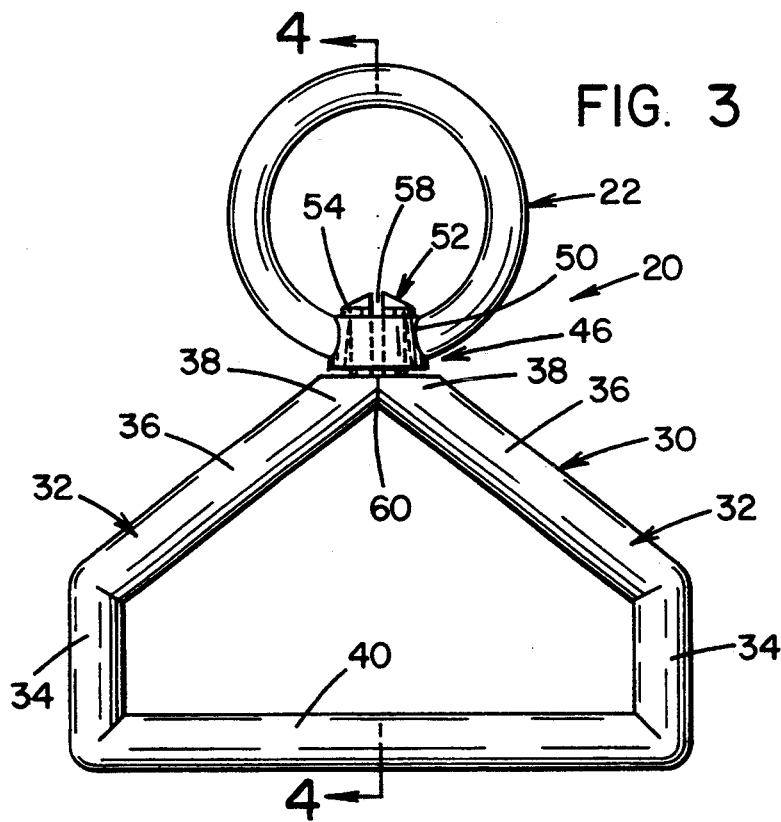
FIG. 3 is a frontal view of the garment hanger device disclosing a support member, frame member and the coupling mechanism connecting the support member to the frame member.
Figure 4:
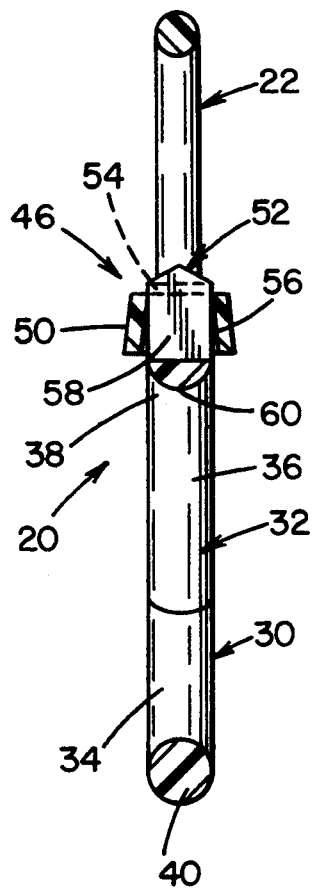
FIG. 4 is a cross sectional side view taken on line 4—4 of FIG. 3.
Figure 5:
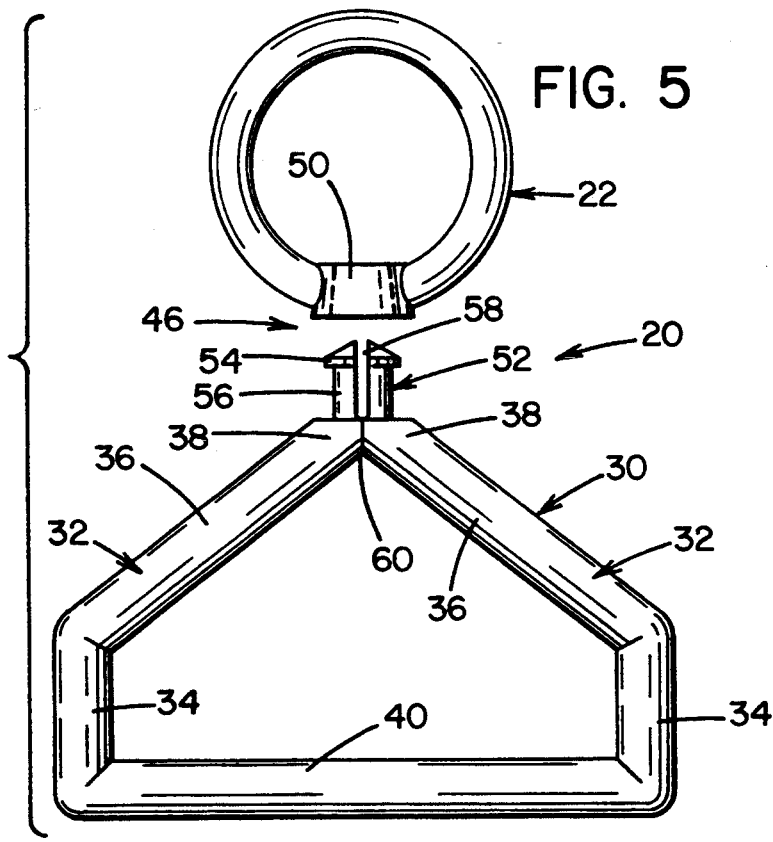
FIG. 5 illustrates the garment hanger device of FIG. 3 prior to the support member being engaged with the frame member.

The features of garment hanger device 20 are best illustrated in FIGS. 3–5. As illustrated in FIG. 3 and 5, frame member 30 is made up of two leg structures 32 and a bar structure 40. Bar structure 40 preferably has a length of less than 6 inches and typically between 2–3 inches. Bar structure 40 preferably has a circular cross sectional shape have a diameter of less than ¾ of an inch. Bar structure 40 is preferably made of a molded plastic. Leg structure 32 preferably contains a first leg portion 34 and a second leg portion 36 as illustrated in FIGS. 3 and 5. First leg portion 34 is connected to the end of bar structure 40 and preferably forms a right angle between the first leg portion 34 and bar structure 40. First leg portion 34 is typically shorter than second leg portion 36. First leg portion 34 and second leg portion 36 are connected to one another and form an angle which is between 90° and 180°. The two leg structures 32 are connected to bar structure 40 in such a manner that the tips of second leg portion 36 converge onto apex point 60. Preferably, all the second leg portion tips 38 join together at apex point 60. The cross sectional shape of both leg portions of leg structure 32 is typically the same and is generally circular in shape. Preferably, the diameter of the cross section of the leg structure is the same as the diameter of the cross section of the bar structure 40. The frame member 30 is preferably made from a plastic material which is formed in a mold which simultaneously forms together the two leg structures 32 and the bar structure 40. First leg portion 34 is preferably connected to the end of bar structure 40 to form a right angle. This configuration is preferred so as to allow garment hangers B to easily be inserted onto frame structure 30 and to maximize the utility of bar structure 40 when supporting garment hangers B. Preferably, the length of first leg portion 34 is less than 1 inch and is preferably ¾ of an inch in length. The length of the second leg portion 36 of leg structure 32 also has a length to assure that the garment hangers can be easily inserted onto frame structure 40. Typically the length of second leg portion 36 is between 1 to 2 inches and preferably 1 ½ inches in length. The lengths of the two leg portions in conjunction with the angles of connection form an apex point which is greater than ½ inch above bar structure 40 and is preferably about 1 ½ inches above bar structure 40. This space between apex point 60 and bar structure 40 allows the garment hangers to be easily inserted onto frame member 30 yet prevents garment hangers B from easily disengaging from frame member 30.

A coupling mechanism 46 used to connect support member 22 to frame member 30 preferably consists of a clip 52 and lock 50. Coupling mechanism 46 connects support member 22 to frame member 30 such that frame member 30 can rotate relative to support member 22. Coupling mechanism 46 is designed to support loads of at least one hundred pounds. Coupling mechanism 46 preferably forms a connection between support member 22 and frame member 30 by inserting clip 52 into lock 50. Lock 50 is preferably located on support member 22 as illustrated in FIGS. 3 and 5.

Lock 50 is designed to have a hollow interior preferably with a circular cross-sectional shape. The interior diameter of the circular cross-section of lock 50 may be uniform or may be tapered as illustrated in FIG. 5. The tapered cross sectional area is preferable so as to allow clip 52 to be easily inserted into lock 50. Clip 52 preferably has a circular cross sectional area and includes a clip head 54 and a clip body 56. Clip head 54 preferably has a cross sectional diameter which is larger than the cross sectional diameter of the clip body 56. The diameter of clip head 54 preferably also has a diameter which is larger than the narrowest inner diameter of lock 50 so that once clip 52 is inserted into lock 50, clip 52 will not disengage from lock 50. Clip 52 preferably contains a clip space 58 which allows clip body 56 and clip head 54 to slightly decrease in diameter so as to allow clip 52 to be inserted into lock 50.

As illustrated in FIG. 5, clip 52 is preferably located at the apex point 60 of frame member 30. Preferably clip 52 is simultaneously formed with frame member 30 from a plastic mold. Lock 50 is preferably formed simultaneously with support member 22 from a plastic mold.

As illustrated in FIG. 4, when clip 52 is inserted into lock 50, clip head 54 prevents clip 52 from disengaging from lock 50 since the cross-sectional diameter of clip head 54 is larger than the cross sectional diameter of lock 50. The length of clip body 56 is greater than or equal to the thickness of lock 50 as illustrated in FIGS. 3 and 4. Clip body 56 has a length at least the width of lock 50 to enable clip head 54 to pass completely through lock 50 so as to form a secure connection between lock 50 and clip 52.

An alternative embodiment for coupling mechanism 46 is illustrated in FIGS. 7–10. In FIG. 7 the clip 52 is located on support member 22 and lock 50 is located at apex point 60 of frame member 30. The design and parameters of the lock 50 and clip 52 are similar to that of FIGS. 3–5.

FIG. 8 illustrates a coupling mechanism 46' whereby clip 52' is inserted into the side of lock 50'. Lock 50' includes a side entrance 62 to allow clip 52' to be inserted into the side of lock 50'. The width of lock side entrance 62 is preferably smaller than the diameter of clip body 56' and/or clip head 54'. As illustrated in FIGS. 8–10, lock side entrance 62 is designed to lock in clip body 56' by having a width which is less than the diameter of clip body 56'. Lock side entrance 62 may also have tapered sides to facilitate the insertion of clip 52' into lock 50'.

Although the invention has been described with reference to specific embodiments, variations within the scope of the following claims will be apparent to those skilled in the art.

Having thus defined the invention, the following is claimed:

1. A garment hanger device for supporting at least one garment hanger comprising:
a frame member including two leg structures whereby each of said leg structures has a first tip and a second tip, a bar structure having two ends and a length therebetween, said length not greater than six inches, each of said bar structure ends attached to one of said first tips, said second tips of said leg structures converge to an apex point;
a support member located adjacent to said frame member apex point;
coupler means for rotatably connecting said support member and said frame member at said apex point, said coupler means including a joint having a cylinder portion and a clip portion, said clip portion rotatably and longitudinally retained within said cylinder portion, said clip portion including a first end and a second end, said first end adjacent said support member, said second end adjacent said frame member.

2. A garment hanger device as defined in claim 1, wherein each said leg structure is connected to said bar structure at a point of connection, and each said leg structure is generally perpendicular to said bar structure at said point of connection.

3. A garment hanger device as defined in claim 2, wherein each of said leg structure has at least two adjacent leg portions whereby adjacent leg portions form an angle of less than 180°.

4. A garment hanger device as defined in claim 3, wherein said leg portions form an angle not less than 90°.

5. A garment hanger device as defined in claim 4, wherein said support member is ring shaped and has an inner diameter between 0.5 to 1.5 inches.

6. A garment hanger device as defined in claim 5, wherein said bar structure length is between two to three inches.

7. A garment hanger device as defined in claim 1, wherein each of said leg structures has at least two adjacent leg portions whereby adjacent leg portions form an angle of less than 180°.

8. A garment hanger device as defined in claim 7, wherein said leg portions form an angle not less than 90°.

9. A garment hanger device as defined in claim 1, wherein said support member is ring shaped and has an inner diameter between 0.5 to 1.5 inches.

10. A garment hanger device as defined in claim 1, wherein said bar structure length is between two to three inches.

11. A garment hanger device as defined in claim 1, wherein said first end includes a clip head for retaining said clip portion within said cylinder portion and said second end is attached to said frame member and extends from said frame member.

12. A garment hanger device as defined in claim 1, wherein said second end includes a clip head for retaining said clip portion within said cylinder portion and said first end is attached to said support member and extends from said support member.

13. A device for supporting at least one garment hanger comprising:
a frame member including at least one hanger bar structure having two ends, and at least two leg structures whereby each said leg structure has two tips, each of said bar structure ends attached to one of said two leg structures;
a support member located adjacent to said frame member;
coupler means for rotatably connecting said support member and said frame member, said coupler means including a cylinder portion having a rim at one end thereof, a clip portion, said clip portion having a first end and a second end, said first end having a clip head with an outer diameter and a tapering surface extending inwardly from said outer diameter, said clip portion having a clip diameter and said cylinder portion having a cylinder diameter, said outer diameter of said clip head greater than said cylinder diameter, said cylinder diameter greater than said clip diameter, said clip head further including a flange portion opposite said tapering surface, said clip portion rotatably retained within said cylinder portion by abutment between said rim and said flange portion, said clip head adjacent said support member, said second end adjacent said frame member.

14. A device as defined in claim 13, wherein one of said tips on each leg structure is attached to one of two said end of said bar structure.

15. A device as defined in claim 13, wherein one of said tips on one said leg structure converges with another said tip on another said leg structure to form an apex point.

16. A device as defined in claim 15, wherein said leg structures have at least two adjacent leg portions, said leg portions forming an angle less than 180°.

17. A device as defined in claim 13, wherein said leg structures have at least two adjacent leg portions, said leg portions forming an angle less than 180°.

18. A device as defined in claim 13, wherein said bar structure has a length, said length is less than six inches.

19. A device as defined in claim 18, wherein said length of said bar structure is between two to three inches.

20. A device as defined in claim 13, wherein said support member is ring shaped and has an inner diameter between 0.5 to 1.5 inches.

21. A garment hanger device for use in an automotive vehicle for supporting at least one garment hanger comprising:

a closed loop frame member, said frame member including a bar portion having a first end and a second end, said bar portion for supporting said at least one garment hanger, a first leg leg portion and a second leg portion, said first leg portion attached to said first end, said second leg portion attached to said second end, said first leg portion and said second leg portion converging to form said closed loop frame member, said bar portion having a length, said length being between two and three inches;

a closed loop support member;

means for rotatably connecting said support member and said frame member, said rotatably connecting means including a joint having a cylinder portion and a clip portion, said clip portion rotatably and longitudinally retained within said cylinder portion, said clip portion including a first end and a second end, said first end adjacent said support member, said second end adjacent said frame member.

* * * * *